US012578703B2

(12) United States Patent  
Sauerbaum, Jr. et al.

(10) Patent No.: US 12,578,703 B2  
(45) Date of Patent: Mar. 17, 2026

(54) SYSTEMS AND METHODS FOR ADDITIVELY MANUFACTURING SEMI-CUSTOM OBJECTS

(71) Applicant: Carbon, Inc., Redwood City, CA (US)

(72) Inventors: James J. Sauerbaum, Jr., Kingston, MA (US); Matthew S. Iczkowski, Denver, CO (US); Kieran Mak, Toronto (CA)

(73) Assignee: Carbon, Inc., Redwood City, CA (US)

( * ) Notice: Subject to any disclaimer, the term of this patent is extended or adjusted under 35 U.S.C. 154(b) by 671 days.

(21) Appl. No.: 18/047,413

(22) Filed: Oct. 18, 2022

(65) Prior Publication Data

US 2023/0117421 A1      Apr. 20, 2023

Related U.S. Application Data

(60) Provisional application No. 63/257,796, filed on Oct. 20, 2021.

(51) Int. Cl.  
*G05B 19/4099*      (2006.01)  
*B33Y 50/00*      (2015.01)

(52) U.S. Cl.  
CPC .......... *G05B 19/4099* (2013.01); *B33Y 50/00* (2014.12); *G05B 2219/49007* (2013.01)

(58) Field of Classification Search  
CPC ...... G05B 19/4099; G05B 2219/49007; B33Y 50/00; B33Y 80/00; B29C 64/386  
USPC ........................................................ 700/97  
See application file for complete search history.

(56) References Cited

U.S. PATENT DOCUMENTS

| | | | |
|---|---|---|---|
| 5,236,637 | A | 8/1993 | Hull |
| 5,391,072 | A | 2/1995 | Lawton et al. |
| 5,529,473 | A | 6/1996 | Lawton et al. |
| 7,043,329 | B2 | 5/2006 | Dias et al. |

(Continued)

FOREIGN PATENT DOCUMENTS

| | | |
|---|---|---|
| WO | 2015164234 A1 | 10/2015 |
| WO | 2016133759 A1 | 8/2016 |

(Continued)

OTHER PUBLICATIONS

Carbon 3d Print Lattice Innovation—the adidas story, available from https://www.carbon3d.com/resources/whitepaper/the-adidas-story (2019) 9 pages.

(Continued)

*Primary Examiner* — Thomas C Lee  
*Assistant Examiner* — Michael Tang  
(74) *Attorney, Agent, or Firm* — Myers Bigel, P.A.

(57) ABSTRACT

A computer-implemented method of making a semi-custom product for a user, includes the steps of: (a) providing a set of data files, each data file representing a distinct variant of the product; (b) providing personal data from the user, the personal data including at least first and second distinct user attributes; (c) providing product preference data from the user, the product preference data including at least first and second distinct product attributes; and then (d) ranking the set of data files with (i) the personal data and (ii) the product preference data to identify a best fit data file, the best fit data file representing a variant of the product that most closely meets the product preference data based on the personal data.

14 Claims, 5 Drawing Sheets

(56) References Cited

U.S. PATENT DOCUMENTS

| | | | |
|---|---|---|---|
| 7,438,846 B2 | 10/2008 | John | |
| 7,892,474 B2 | 2/2011 | Shkolnik et al. | |
| 8,110,135 B2 | 2/2012 | El-Siblani | |
| 8,346,624 B2 | 1/2013 | Goad et al. | |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 9,453,142 B2 | 9/2016 | Rolland et al. | |
| 9,598,606 B2 | 3/2017 | Rolland et al. | |
| 9,676,963 B2 | 6/2017 | Rolland et al. | |
| 9,817,439 B2 | 11/2017 | Gosieski et al. | |
| 9,895,841 B2 | 2/2018 | Page | |
| 9,914,038 B2 | 3/2018 | Esayian et al. | |
| 10,159,296 B2 | 12/2018 | Pietrzak et al. | |
| 10,188,319 B2 | 1/2019 | Schwartz et al. | |
| 10,588,359 B2 | 3/2020 | Trangmar et al. | |
| 10,780,338 B1 | 9/2020 | Bologna et al. | |
| 10,948,898 B1 | 3/2021 | Pietrzak et al. | |
| 10,993,483 B2 | 5/2021 | Trangmar et al. | |
| 11,022,984 B2 | 6/2021 | Zhu et al. | |
| 11,074,747 B2 | 7/2021 | Singh et al. | |
| 2011/0137818 A1* | 6/2011 | Goad | G06Q 30/0613 |
| | | | 705/347 |
| 2013/0292862 A1 | 11/2013 | Joyce | |
| 2013/0295212 A1 | 11/2013 | Chen et al. | |
| 2015/0055085 A1* | 2/2015 | Fonte | G02C 7/024 |
| | | | 700/98 |
| 2015/0331402 A1 | 11/2015 | Lin et al. | |
| 2015/0360419 A1 | 12/2015 | Willis et al. | |
| 2015/0379599 A1* | 12/2015 | Bodell | G06Q 30/0603 |
| | | | 705/26.35 |
| 2016/0288376 A1 | 10/2016 | Sun et al. | |
| 2017/0129167 A1 | 5/2017 | Castanon | |
| 2017/0129169 A1 | 5/2017 | Batchelder et al. | |
| 2017/0270709 A1* | 9/2017 | Tran | G06T 19/20 |
| 2017/0281367 A1 | 10/2017 | Ketchum et al. | |
| 2020/0100554 A1 | 4/2020 | Bologna et al. | |
| 2020/0215415 A1 | 7/2020 | Bologna et al. | |
| 2021/0024155 A1 | 1/2021 | Primeaux et al. | |
| 2021/0177093 A1 | 6/2021 | Perrault et al. | |
| 2023/0222531 A1* | 7/2023 | Cella | G06Q 10/0631 |
| | | | 705/7.31 |
| 2024/0138523 A1* | 5/2024 | Wang | A43B 3/44 |

FOREIGN PATENT DOCUMENTS

| | | |
|---|---|---|
| WO | 2016145182 A1 | 9/2016 |
| WO | 2020146092 A1 | 7/2020 |

OTHER PUBLICATIONS

Bikas, H. , et al., "Additive manufacturing methods and modelling approaches: a critical review", Int J Adv Manuf Technol, 83, 2016, 389-405.

Janusziewcz, R. , et al., "Layerless fabrication with continuous liquid interface production", Proc. Natl. Acad. Sci. USA 113, 11703-11708, Oct. 18, 2016.

Tumbleston, John R., et al., "Continuous liquid interface production of 3D Objects", Science, 347(6228), 2015, 1349-1352.

* cited by examiner

SYSTEMS AND METHODS FOR ADDITIVELY MANUFACTURING SEMI-CUSTOM OBJECTS

RELATED APPLICATIONS

This application claims priority from U.S. Provisional Application Ser. No. 63/257,796, filed Oct. 20, 2021, the disclosure of which is incorporated by reference in its entirety.

FIELD

The present invention concerns methods and systems for additively manufacturing semi-custom garments, garment inserts, protective pads, and the like.

BACKGROUND

Continuous liquid interface production (CLIP), combined with flexible and elastic dual cure additive manufacturing resins and software tools for creating well-tuned lattice structures, has enabled the additive manufacture of a variety of wearable products. Examples of such products include footwear midsoles, helmet liners, and bicycle saddles (see, Carbon 3d Print Lattice Innovation—The adidas story (2019); see also Perrault et al., US Pat. App. Pub. No. US 2021/0177093 (Jun. 17, 2021); Primeaux et al., US Pat. App. Pub. No. US 2021/0024155 (Jan. 28, 2021); and Pietrzak and Lowe, U.S. Pat. Nos. 10,948,898 and 10,159,296).

The opportunity to use additive manufacturing to produce custom wearable articles (that is, products conforming to a specific wearer's unique shape and needs) has not gone unnoticed (See, e.g., Page, U.S. Pat. No. 9,895,841). Dias et al. (U.S. Pat. No. 7,043,329) describe the production of custom knit garments such as compression sleeves from a 3D shape image and a desired pressure profile. Schwartz and Schwartz (U.S. Pat. No. 10,188,319) describe a method for additively manufacturing a custom orthotic or insole from pressure data for the intended recipient. Ketchum and Rothenberg (US Pat. App. Pub. No. US2017/0281367), describe methods of additively manufacturing a custom breast prosthesis from 3D scans. Trangmar et al. (U.S. Pat. Nos. 10,993,483 and 10,588,359) describes methods of additively manufacturing custom clothing support pieces such as brassiere cups from a 3D digital image of the wearer. Gosieski et al. (U.S. Pat. No. 9,817,439) describe a system for additively manufacturing custom human-interfacing devices (including wearable devices, equipment, and tools) from specific human body data. Bologna et al. (U.S. Pat. No. 10,780,338) describes a system for additively manufacturing bespoke protective sports equipment with custom-formed, 3D printed, internal padding from the player's unique data. Bologna et al. describe still further systems in US Patent Application Publication Nos. US2020/0215415 and US2020/0100554.

A problem with existing techniques is that they typically require generating a data file for an entirely new article anew for each customized product. Yet additive manufacturing techniques vary widely from one another. Each technique can have its own advantages and disadvantages for making any specific product, and each technique may require tuning of the process or re-design of the product to effectively produce the desired object. Hence, custom products represented by newly generated data files may not be suitable for manufacturing on a particular apparatus or from a particular raw (or "build") material. Accordingly, there is a need for new approaches for generating personalized articles in a way that is practical given the constraints of particular additive manufacturing systems.

SUMMARY

A computer-implemented method of making a semi-custom product for a user is described herein, the method including the steps of: (a) providing a set of data files, each data file representing a distinct variant of the product; (b) providing (e.g., collecting and/or inputting) personal data from the user, the personal data including at least first and second distinct user attributes; (c) providing (e.g., collecting and/or inputting) product preference data from the user, the product preference data including at least first and second distinct product attributes; (d) ranking the set of data files with (i) the personal data and (ii) the product preference data to identify a best fit data file, the best fit data file representing a variant of the product that most closely meets the product preference data based on the personal data, and then, in some embodiments, (e) additively manufacturing the product from the best fit data file.

In some embodiments: each data file in the set of data files of step (a) is validated for manufacture on a specific additive manufacturing apparatus type; and the additively manufacturing step (e) is carried out on an additive manufacturing apparatus of the type for which the best fit data file is validated.

In some embodiments: each data file in the set of data files of step (a) is validated for manufacture with a specific build material; and the additively manufacturing step (e) is carried out with a build material for which the best fit data file has been validated.

In some embodiments: each data file in the set of data files of step (a) is validated for manufacture with a specific orientation of the part in said apparatus; and the additively manufacturing step (e) is carried out with the part oriented in the apparatus in the same orientation for which the best fit data file has been validated.

Also described herein is a method of making a semi-custom product for a user, the product including a plurality of adjacent connected subsections. This method includes the steps of: (a) providing a set of data files for at least one of those subsections, each data file representing a distinct variant of said subsection; (b) providing (e.g., collecting and/or inputting) personal data from the user, the personal data comprising at least first and second distinct user attributes; (c) providing (e.g., collecting and/or inputting) product subsection preference data from the user, the product subsection preference data including at least first and second distinct product subsection attributes; (d) ranking the set of data files with (i) the personal data and (ii) the product subsection preference data to identify a best fit data file, the best fit data file representing a variant of the subsection that most closely meets the product preference data based on the personal data; (e) generating a consolidated data file for the semi-custom product from the best fit data file and at least one additional data file for the remaining subsections of the product, and then, in some embodiments, (f) additively manufacturing the product from the consolidated data file.

In some embodiments: each data file in the set of data files of step (a) is validated for manufacture on a specific additive manufacturing apparatus type; and the additively manufacturing step (f) is carried out on an additive manufacturing apparatus of the type for which the best fit data file is validated.

In some embodiments: each data file in the set of data files of step (a) is validated for manufacture with a specific build material; and the additively manufacturing step (f) is carried out with a build material for which the best fit data file has been validated.

In some embodiments: each data file in the set of data files of step (a) is validated for manufacture with a specific orientation of the part in the apparatus; and the additively manufacturing step (f) is carried out with the part subsection oriented in the apparatus in the same orientation for which the best fit data file has been validated.

In some embodiments, the product includes a saddle (e.g., bicycle saddle), footwear midsole, footwear innersole, orthotic insert, helmet liner pad, body pad (e.g., a knee, shoulder, arm, hand, wrist, elbow, hip, or back pad), orthopedic appliance, prosthetic appliance, protective garment, protective glove, brassiere or component thereof (e.g., insertable cup or support).

In some embodiments, each user attribute includes: anatomical data (e.g., weight, size, or shape of the user's body or portion thereof); or performance, biometric, and/or behavioral data (e.g., local shear, local temperature, gait data, task performance style, or other biometric data); or personal data (e.g., age, VO2 Max, gender or gender identity, experience level) (e.g., in particular sport, training or fitness level, etc.).

In some embodiments, each product attribute includes weight, tightness, stiffness or elasticity, ventilation, body contact, and/or surface texture.

In some embodiments, the step of (b) providing personal data is carried out with a pressure sensor, imaging apparatus, automated measuring device, manual measuring device, or combination thereof.

In some embodiments, the step of (c) providing product or product subsection preference data includes weighting (or prioritizing) the distinct product attributes with respect to one another based on preferences of said user.

In some embodiments: (i) the step of (c) providing product preference data includes bounding the most heavily weighted (i.e., the highest priority) product or product subsection attribute with a general tolerance range; (ii) the step (d) includes generating a stringent tolerance within the general tolerance range, and is carried out with the stringent tolerance range less than the general tolerance range; and then (iii) if no best fit data file is identified, repeating step (d) with a relaxed tolerance range greater than the stringent tolerance range but at or within the general tolerance range.

In some embodiments, the additively manufacturing step is carried out with an apparatus selected from the group consisting of top-down stereolithography (i.e., vat polymerization) apparatus, bottom-up stereolithography (e.g., continuous liquid interface production) apparatus, jet-fusion apparatus (e.g., multi-jet fusion apparatus, inkjet printing apparatus), selective laser sintering apparatus, or selective laser melting apparatus.

In some embodiments, the build material is selected from the group consisting of polymerizable liquid resins, sinterable particles, and fusible particles.

Also described herein is a computer program product for operating an electronic device including a non-transitory computer readable storage medium having computer readable program code embodied in the medium that when executed by a processor causes the processor to perform operations including the methods described herein.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

Figure 1:
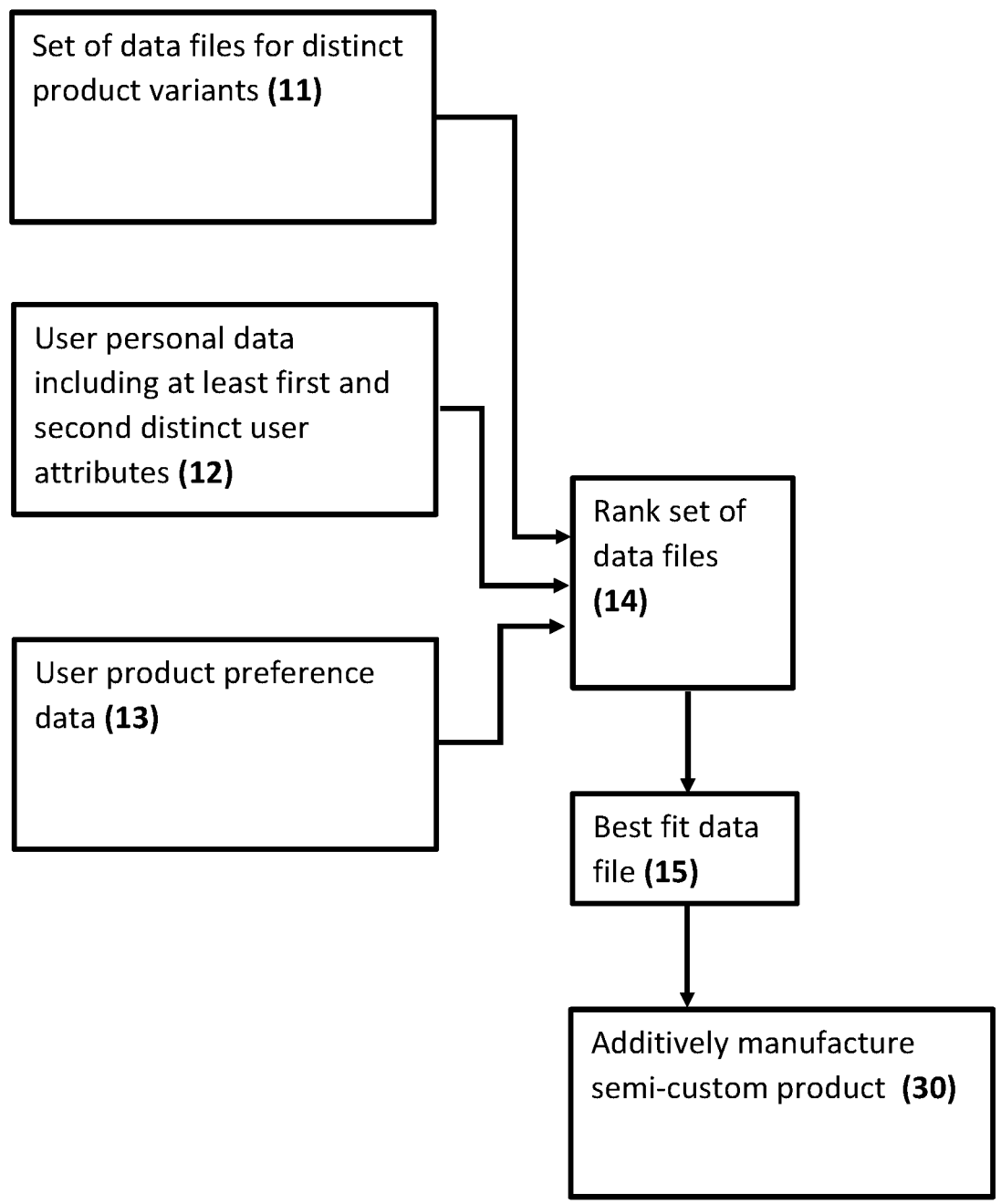
FIG. 1 is a flow chart schematically illustrating a first embodiment of a method as described herein.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Additive Manufacturing.

Techniques for additive manufacturing are known. Suitable techniques include, but are not limited to, techniques such as selective laser sintering (SLS), fused deposition modeling (FDM), stereolithography (SLA), material jetting including three-dimensional printing (3DP) and multijet modeling (MJM) (MJM including Multi-Jet Fusion such as available from Hewlett Packard), and others. See, e.g., H. Bikas et al., *Additive manufacturing methods and modelling approaches: a critical review*, Int. J. Adv. Manuf. Technol. 83, 389-405 (2016).

Resins for additive manufacturing of polymer articles are known and described in, for example, DeSimone et al., U.S. Pat. Nos. 9,211,678; 9,205,601; and 9,216,546. Dual cure resins for additive manufacturing are known and described in, for example, Rolland et al., U.S. Pat. Nos. 9,676,963; 9,598,606; and 9,453,142. Non-limiting examples of dual cure resins include, but are not limited to, resins for producing objects comprised of polymers such as polyurethane, polyurea, and copolymers thereof; objects comprised of epoxy; objects comprised of cyanate ester; objects comprised of silicone, etc.

Stereolithography, including bottom-up and top-down techniques, are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the object is formed by continuous liquid interface production (CLIP). CLIP is known and described in, for example, PCT Application Nos. PCT/US2014/015486 (U.S. Pat. No. 9,211,678); PCT/US2014/015506 (U.S. Pat. No. 9,205,601), PCT/US2014/015497 (U.S. Pat. No. 9,216,546), and in J. Tumbleston, D. Shirvanyants, N. Ermoshkin et al., Continuous liquid interface production of 3D Objects, *Science* 347, 1349-1352 (2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially-cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I. Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

Other examples of methods and apparatus for carrying out particular embodiments of CLIP include, but are not limited to: Batchelder et al., Continuous liquid interface production system with viscosity pump, US Patent Application Pub. No. US 2017/0129169 (May 11, 2017); Sun and Lichkus, Three-dimensional fabricating system for rapidly producing objects, US Patent Application Pub. No. US 2016/0288376 (Oct. 6, 2016); Willis et al., 3d print adhesion reduction during cure process, US Patent Application Pub. No. US 2015/0360419 (Dec. 17, 2015); Lin et al., Intelligent 3d printing through optimization of 3d print parameters, US Patent Application Pub. No. US 2015/0331402 (Nov. 19, 2015); and D. Castanon, Stereolithography System, US Patent Application Pub. No. US 2017/0129167 (May 11, 2017).

After the object is formed, it is typically cleaned (e.g., by washing, centrifugal separation, wiping/blowing, etc., including combinations thereof), and in some embodiments then further cured, such as by baking (although further curing may in some embodiments be concurrent with the first cure, or may be by different mechanisms such as by contacting to water, as described in U.S. Pat. No. 9,453,142 to Rolland et al.).

2. Semi-Custom Product Manufacturing.

A. Overview.

Figure 2:
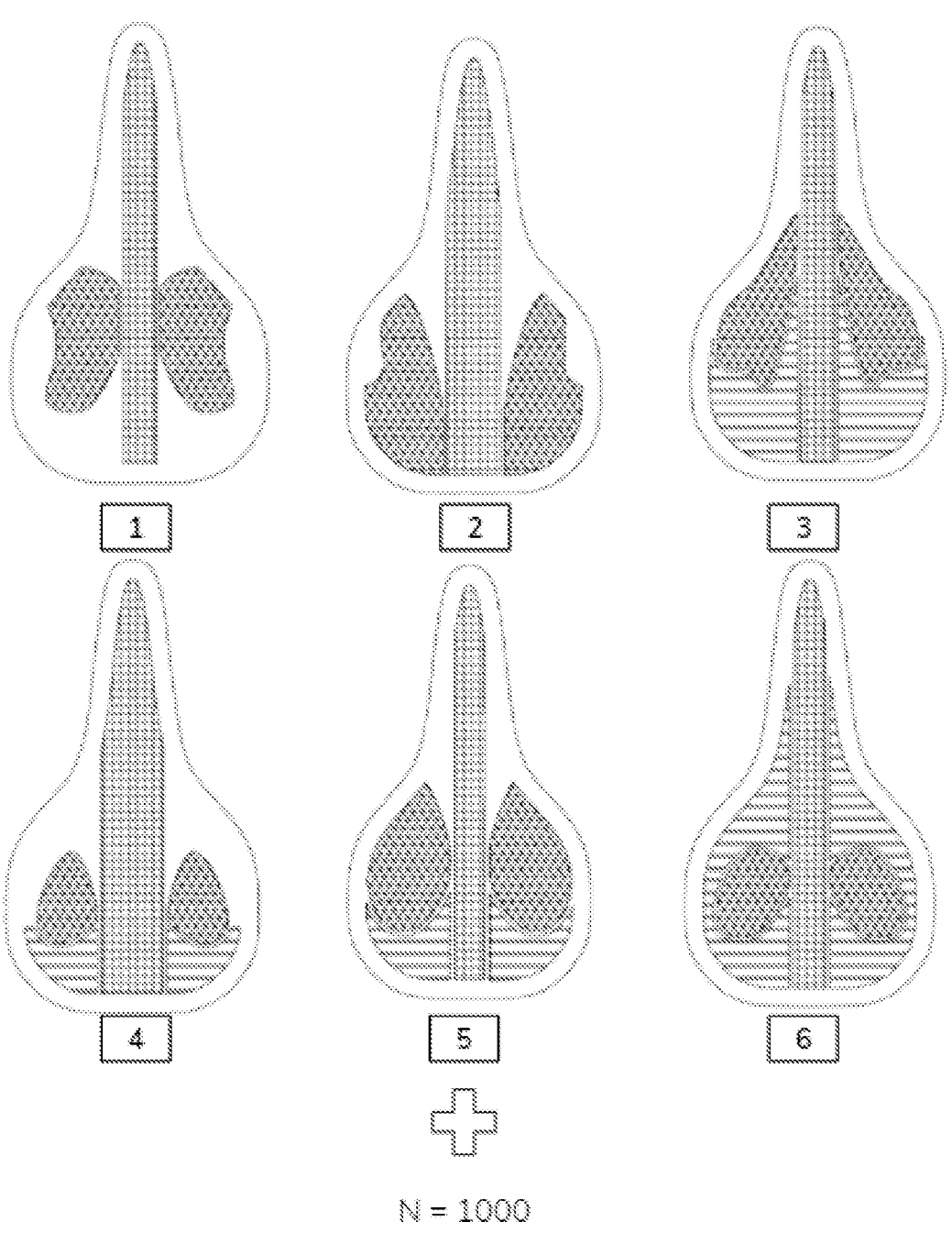
FIG. 2 schematically illustrates one embodiment of a set of data files for distinct product variants for use in a system and method as described herein.

As indicated above, and schematically illustrated in FIG. 1, a computer-implemented method of making a semi-custom product for a user includes the steps of:

(a) providing a set of data files (11), each data file representing a distinct variant of the product (see, for example, FIG. 2);

(b) providing (e.g., collecting and/or inputting) personal data from the user (12), the personal data including at least first and second distinct user attributes;

(c) providing (e.g., collecting and/or inputting) product preference data from the user (13), the product preference data including at least first and second distinct product attributes; and then (d) ranking the set of data files (14) with (i) the personal data and (ii) the product preference data to identify a best fit data file (15), the best fit data file representing a variant of the product that most closely meets the product preference data based on the personal data; and then, in some embodiments:

(e) additively manufacturing (30) the product from the best fit data file.

Figure 4:
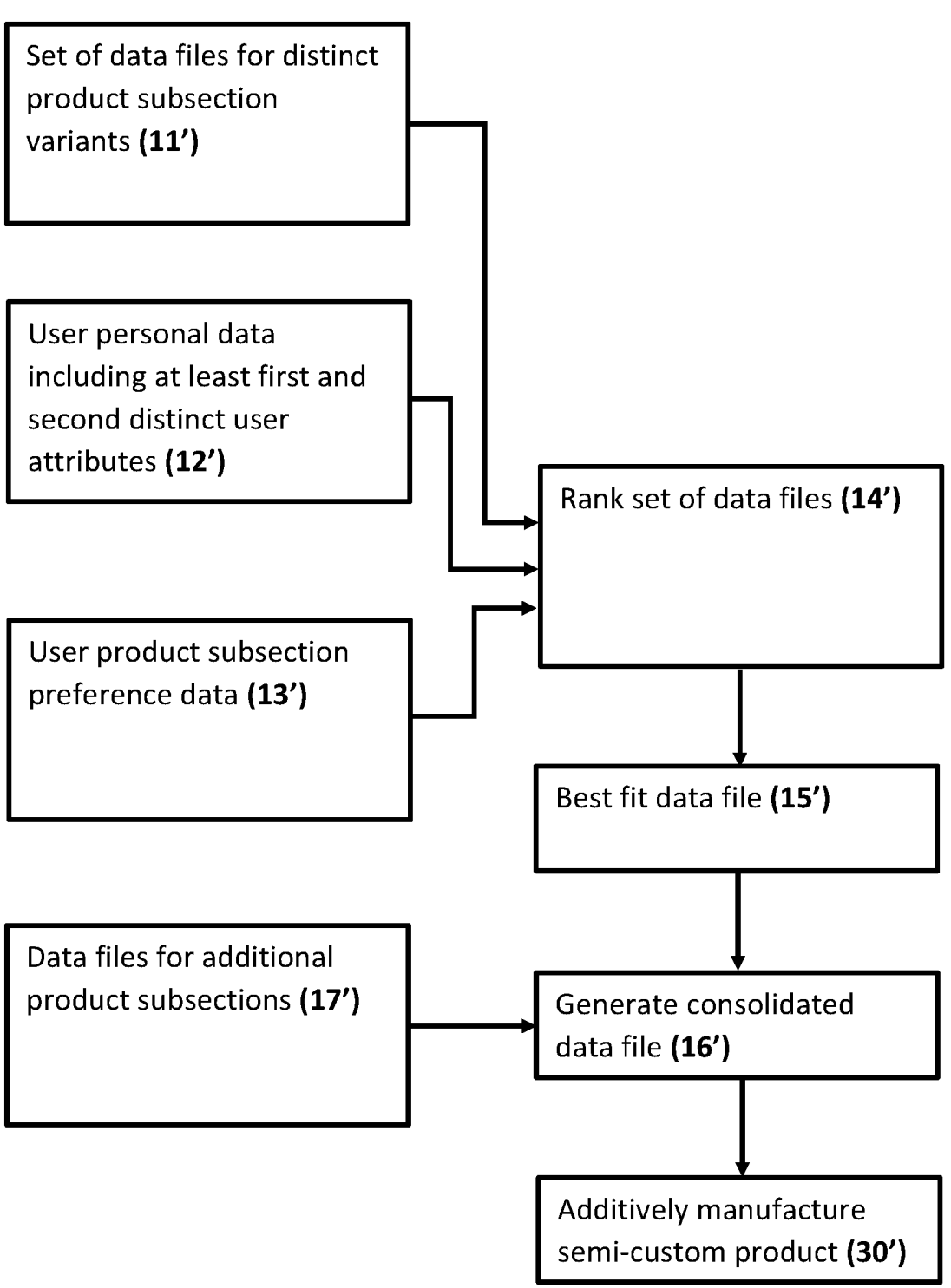
FIG. 4 is a flow chart schematically illustrating a third embodiment of a method as described herein.
Figure 5:
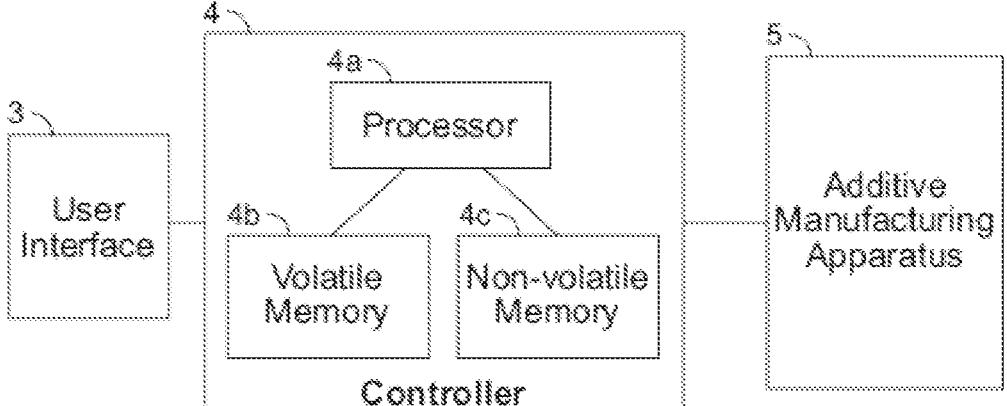
FIG. 5 is a schematic illustration of an apparatus for carrying out a process of FIGS. 1, 3, and 4.

Also described herein, and schematically illustrated in FIG. 4, is method of making a semi-custom product for a user, the product including a plurality of adjacent connected subsections, the method including the steps of:

(a) providing a set of data files (11') for at least one of the subsections, each data file representing a distinct variant of the subsection;

(b) providing (e.g., collecting and/or inputting) personal data (12') from the user, the personal data including at least first and second distinct user attributes;

(c) providing (e.g., collecting and/or inputting) product subsection preference data (13') from the user, the product subsection preference data including at least first and second distinct product subsection attributes;

(d) ranking (14') the set of data files with (i) the personal data and (ii) the product subsection preference data to identify a best fit data file (15'), the best fit data file representing a variant of the subsection that most closely meets the product preference data based on the personal data; then (e) generating a consolidated data file (16') for the semi-custom product from the best fit data file and at least one additional data file (17') for the remaining subsections of the product, and then, in some embodiments, (f) additively manufacturing (30') the semi-custom product from the consolidated data file.

Ranking of data files to identify a best fit data file can be carried out by any of a variety of techniques known in the art, including but not limited to standard competition ranking, modified competition ranking, dense ranking, ordinal ranking, fractional ranking, and modifications and combinations thereof. Additional examples of ranking techniques include, but are not limited to, those set forth in U.S. Pat. Nos. 11,074,747; 11,022,984; 9,914,038; 9,895,841; and 8,346,624, the disclosures of which are incorporated herein by reference.

B. Validation of Data Files.

In some preferred embodiments of the foregoing, each data file in the set of data files of step (a) is validated for manufacture on a specific additive manufacturing apparatus type; and additively manufacturing step (e) or (f) when present is carried out on an additive manufacturing apparatus of the type for which the best fit data file is validated.

In some preferred embodiments of the foregoing, each data file in the set of data files of step (a) is validated for manufacture with a specific build material; and additively manufacturing step (e) or (f) when present is carried out with a build material for which the best fit data file has been validated.

In some preferred embodiments of the foregoing, each data file in the set of data files of step (a) is validated for manufacture with a specific orientation of the part in the apparatus; and additively manufacturing step (e) or (f) when present is carried out with the part or part subsection oriented in the apparatus in the same orientation for which the best fit data file has been validated.

Validation of data files for specific build materials, additive manufacturing apparatus, and/or part or part subsection orientation can be carried out by any suitable technique, such as by computer modeling or simulation, actual production of printed parts for further quality control analysis, and combinations thereof. The degree of specificity of resin type, apparatus type, and/or orientation for validation may depend on the speed and/or accuracy requirements for the particular part being produced, with parts requiring narrow tolerance ranges requiring validation to specific machine or resin supplier catalog numbers, while parts with more relaxed tolerance ranges only requiring validation to a general apparatus and/or build material category (e.g., a stereolithography apparatus versus a laser sintering apparatus, a liquid versus a powder build material). Quality control of the part being produced may include considerations such as production speed, failure frequency, frequency of defects, deviation from a tolerance range, etc., in accordance with known techniques.

For the production of parts or objects requiring high levels of accuracy, production reliability, or the like, validation may further include validation of a particular a stable release operating program for controlling the additive manufacturing apparatus on which the part will be produced and producing the part on an additive manufacturing apparatus controlled by the stable release operating program, as described in J. Tumbleston et al., Systems and apparatuses for additive manufacturing with process update and lock down, PCT Application Publication No. WO2020/146092 (published 16 Jul. 2020).

C. User and Product Attributes.

Examples of user attributes that may be used in the methods described herein (e.g., anatomical data, performance, biometric, and/or behavioral data, and/or personal data), are given in Table 1 below, and examples or product attributes that can be used in the methods described herein are given in Table 2 below.

TABLE 1

| USER ATTRIBUTES | |
|---|---|
| Anatomical data | weight, size, or shape of the user's body or portion thereof |
| Performance, biometric, and/or behavioral data | local shear, local temperature, gait data, task performance style, or other biometric data |
| Personal data | Age, VO2 Max, gender or gender identity, experience (e.g., in particular sport), training or fitness level, etc. |

TABLE 2

| PRODUCT ATTRIBUTES |
| --- |
| weight, tightness, stiffness or elasticity, ventilation, body contact surface texture, etc. |

The step of (b) providing personal data in any of the methods described herein can be carried out with instruments and methods known in the art, including but not limited to pressure sensors, imaging apparatus, manual measuring devices (e.g., scales, tape measures, calipers, Brannock devices (for foot measurement), etc.), automated measuring devices (including automated tape measures, calipers, Brannock devices, etc.), and combinations thereof. All of the foregoing may be direct measuring or indirect measuring (for example, by taking a casting or imprint which is then measured).

D. Weighting of Preference Data.

Figure 3:
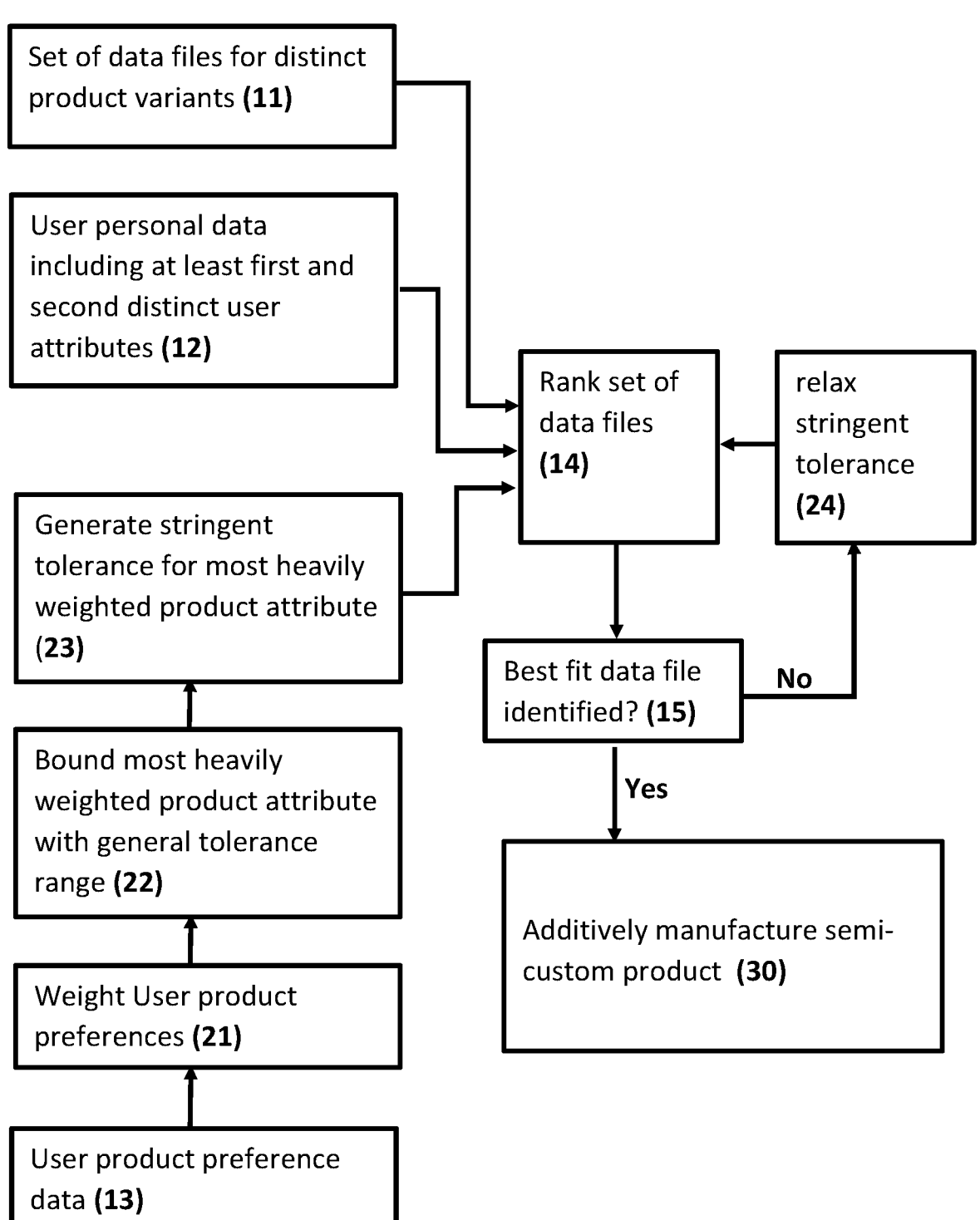
FIG. 3 is a flow chart schematically illustrating a second embodiment of a method as described herein.

In some embodiments, and as schematically illustrated in FIG. 3, the step of (c) providing product preference data in the method of FIG. 1 (or product subsection preference data in the method of FIG. 4) can includes weighting (or prioritizing) (21) the distinct product attributes with respect to one another based on preferences of the user. Where weighting is included, in some embodiments:

(i) step of (c) providing product preference data includes bounding (22) the most heavily weighted (i.e., the highest priority) product or product subsection attribute with a general tolerance range;

(ii) step (d) includes generating a stringent tolerance (23) within the general tolerance range, and is carried out with the stringent tolerance range less than the general tolerance range; and then (iii) if no best fit data file is identified, repeating step (d) with a relaxed tolerance range (24) greater than the stringent tolerance range but at or within the general tolerance range.

While such weighting (and relaxing) is illustrated in FIG. 3 with respect to the embodiment of FIG. 1, these steps can be implemented in like manner in connection with the embodiment of FIG. 4.

E. Products.

Examples of products that can be made by the methods described above include, but are not limited to, saddles (e.g., bicycle saddle), footware midsoles, footware innersoles, orthotic inserts, helmet liner pads, body pads (e.g., a knee, shoulder, arm, hand, wrist, elbow, hip, or back pad), orthopedic appliances, prosthetic appliances, protective garments, protective gloves, brassieres, or components of any of the foregoing (e.g., insertable cup or support).

As indicated previously, these products can be made by any of a variety of additive manufacturing apparatus, including but not limited to top-down stereolithography (i.e., vat polymerization) apparatus, bottom-up stereolithography (e.g., continuous liquid interface production) apparatus, jet-fusion apparatus (e.g., multi-jet fusion apparatus, inkjet printing apparatus), selective laser sintering apparatus, or selective laser melting apparatus. Example build materials, the choice of which will depend to some extent on the type of apparatus employed, include but are not limited to polymerizable liquid resins, sinterable particles, and fusible particles. As noted above, validation of particular data files may in some embodiments be as general as these categories of apparatus and build materials, but in some embodiments may be as specific as particular make and models of apparatus, and particular catalog number of build materials.

3. Apparatus.

An apparatus for carrying out a non-limiting embodiment of the present invention is schematically illustrated in FIG. 3. Such an apparatus includes a user interface 3 for inputting instructions (such as selection of an object to be produced, selection of features to be added to the object, personal data, product preference data, product subsection preference data, etc.), a controller 4, and a stereolithography apparatus 5 such as described above. An optional washer (not shown) can be included in the system if desired, or a separate washer can be utilized. Similarly, for dual cure resins, an oven (not shown) can be included in the system, although a separately-operated oven can also be utilized.

Connections between components of the system can be by any suitable configuration, including wired and/or wireless connections. The components may also communicate over one or more networks, including any conventional, public and/or private, real and/or virtual, wired and/or wireless network, including the Internet.

The controller 4 may be of any suitable type, such as a general-purpose computer. Typically, the controller will include at least one processor 4a, a volatile (or "working") memory 4b, such as random-access memory, and at least one non-volatile or persistent memory 4c, such as a hard drive or a flash drive. The controller 4 may use hardware, software implemented with hardware, firmware, tangible computer-readable storage media having instructions stored thereon, and/or a combination thereof, and may be implemented in one or more computer systems or other processing systems. The controller 4 may also utilize a virtual instance of a computer. As such, the devices and methods described herein may be embodied in any combination of hardware and software that may all generally be referred to herein as a "circuit," "module," "component," and/or "system." Furthermore, example embodiments of the present inventive concepts may take the form of a computer program product comprising a non-transitory computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one processor 4a of the controller 4 may be configured to execute computer program code for carrying out operations for aspects of the present invention, which computer program code may be written in any combination of one or more programming languages, including an object oriented programming language such as Java, Scala, Smalltalk, Eiffel, JADE, Emerald, C++, C#, VB.NET, or the like, conventional procedural programming languages, such as the "C" programming language, Visual Basic, Fortran 2003, COBOL 2002, PHP, ABAP, dynamic programming languages such as Python, PERL, Ruby, and Groovy, or other programming languages.

The at least one processor 4a may be, or may include, one or more programmable general purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices, which may be collocated or distributed across one or more data networks.

Connections between internal components of the controller 4 are shown only in part and connections between internal components of the controller 4 and external components are not shown for clarity, but are provided by additional components known in the art, such as busses, input/output boards, communication adapters, network adapters, etc. The connections between the internal components of the controller 4, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, an Advanced Technology Attachment (ATA) bus, a Serial ATA (SATA) bus, and/or an Institute of Electrical and Electronics Engineers (IEEE) standard 1394 bus, also called "Firewire."

The user interface 3 may be of any suitable type. The user interface 3 may include a display and/or one or more user input devices. The display may be accessible to the at least one processor 4a via the connections between the system components. The display may provide graphical user interfaces for receiving input, displaying intermediate operation/data, and/or exporting output of the methods described herein. The display may include, but is not limited to, a monitor, a touch screen device, etc., including combinations thereof. The input device may include, but is not limited to, a mouse, keyboard, camera, etc., including combinations thereof. The input device may be accessible to the at least one processor 4a via the connections between the system components. The user interface 3 may interface with and/or be operated by computer readable software code instructions resident in the volatile memory 4b that are executed by the processor 4a.

Example embodiments of the present inventive concepts are described herein with reference to flowchart and/or block diagram illustrations. It will be understood that each block of the flowchart and/or block diagram illustrations, and combinations of blocks in the flowchart and/or block diagram illustrations, may be implemented by computer program instructions and/or hardware operations. These computer program instructions may be provided to a processor (e.g., processor 4a) of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the functions specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

The foregoing is illustrative of the present invention, and is not to be construed as limiting thereof. The invention is defined by the following claims, with equivalents of the claims to be included therein.

We claim:

1. A computer-implemented method of making a semi-custom product for a user, comprising the steps of:
   (a) providing a set of data files, each data file representing a distinct variant of said product;
   (b) providing personal data from the user, the personal data comprising at least first and second distinct user attributes;
   (c) providing product preference data from the user, the product preference data comprising at least first and second distinct product attributes; and then
   (d) ranking said set of data files with (i) said personal data and (ii) said product preference data to identify a best fit data file, said best fit data file representing a variant of said product that most closely meets said product preference data based on said personal data; and
   (e) additively manufacturing said product from said best fit data file, wherein:
   each data file in said set of data files of step (a) is validated for manufacture on a specific additive manufacturing apparatus type; and
   said additively manufacturing step (e) is carried out on an additive manufacturing apparatus of the type for which said best fit data file is validated,
   wherein said step of (c) providing product preference data includes weighting (or prioritizing) said distinct product attributes with respect to one another based on preferences of said user, and wherein:

(i) said step of (c) providing product preference data includes bounding the most heavily weighted product attribute with a general tolerance range;

(ii) said step (d) includes generating a stringent tolerance within said general tolerance range, and is carried out with said stringent tolerance range less than said general tolerance range; and then (iii) if no best fit data file is identified, repeating step (d) with a relaxed tolerance range greater than said stringent tolerance range but at or within said general tolerance range.

2. The method of claim 1, wherein:

each data file in said set of data files of step (a) is validated for manufacture with a specific build material; and said additively manufacturing step (e) is carried out with a build material for which said best fit data file has been validated.

3. The method of claim 2, wherein:

each data file in said set of data files of step (a) is validated for manufacture with a specific orientation of said product in said apparatus; and said additively manufacturing step (e) is carried out with said product oriented in said apparatus in the same orientation for which said best fit data file has been validated.

4. A computer program product for operating an electronic device comprising a non-transitory computer readable storage medium having computer readable program code embodied in the medium that when executed by a processor causes the processor to perform operations comprising the method of claim 1.

5. A method of making a semi-custom product for a user, the product comprising a plurality of adjacent connected subsections, the method comprising the steps of:

(a) providing a set of data files for at least one of said subsections, each data file representing a distinct variant of said subsection;

(b) providing personal data from the user, the personal data comprising at least first and second distinct user attributes;

(c) providing product subsection preference data from the user, the product subsection preference data comprising at least first and second distinct product subsection attributes;

(d) ranking said set of data files with (i) said personal data and (ii) said product subsection preference data to identify a best fit data file, said best fit data file representing a variant of said subsection that most closely meets said product preference data based on said personal data; then (e) generating a consolidated data file for said semi-custom product from said best fit data file and at least one additional data file for the remaining subsections of said product; and (f) additively manufacturing said semi-custom product from said consolidated data file, wherein:

each data file in said set of data files of step (a) is validated for manufacture with a specific build material; and said additively manufacturing step (f) is carried out with a build material for which said best fit data file has been validated, wherein said step of (c) providing product preference data includes weighting (or prioritizing) said distinct product attributes with respect to one another based on preferences of said user, and wherein:

(i) said step of (c) providing product preference data includes bounding the most heavily weighted product attribute with a general tolerance range;

(ii) said step (d) includes generating a stringent tolerance within said general tolerance range, and is carried out with said stringent tolerance range less than said general tolerance range; and then (iii) if no best fit data file is identified, repeating step (d) with a relaxed tolerance range greater than said stringent tolerance range but at or within said general tolerance range.

6. The method of claim 5, wherein:

each data file in said set of data files of step (a) is validated for manufacture on a specific additive manufacturing apparatus type; and said additively manufacturing step (f) is carried out on an additive manufacturing apparatus of the type for which said best fit data file is validated.

7. The method of claim 6, wherein:

each data file in said set of data files of step (a) is validated for manufacture with a specific orientation of said product in said apparatus; and said additively manufacturing step (f) is carried out with said product subsection oriented in said apparatus in the same orientation for which said best fit data file has been validated.

8. The method of claim 5, wherein said product comprises a saddle, footwear midsole, footwear innersole, orthotic insert, helmet liner pad, body pad, orthopedic appliance, prosthetic appliance, protective garment, protective glove, brassiere or component thereof.

9. The method of claim 5, wherein each said user attribute comprises:

anatomical data; or performance, biometric, and/or behavioral data; or personal data.

10. The method of claim 5, wherein each said product attribute comprises weight, tightness, stiffness or elasticity, ventilation, body contact, and/or surface texture.

11. The method of claim 5, wherein said step of (b) providing personal data is carried out with a pressure sensor, imaging apparatus, automated measuring device, manual measuring device, or combination thereof.

12. The method of claim 5, wherein said additively manufacturing step is carried out with an apparatus selected from the group consisting of top-down stereolithography apparatus, bottom-up stereolithography apparatus, jet-fusion apparatus, selective laser sintering apparatus, or selective laser melting apparatus.

13. The method of claim 5, wherein said build material is selected from the group consisting of polymerizable liquid resins, sinterable particles, and fusible particles.

14. A method of making a semi-custom product for a user, the product comprising a plurality of adjacent connected subsections, the method comprising the steps of:

(a) providing a set of data files for at least one of said subsections, each data file representing a distinct variant of said subsection;

(b) providing personal data from the user, the personal data comprising at least first and second distinct user attributes;

(c) providing product subsection preference data from the user, the product subsection preference data comprising at least first and second distinct product subsection attributes;

(d) ranking said set of data files with (i) said personal data and (ii) said product subsection preference data to identify a best fit data file, said best fit data file representing a variant of said subsection that most closely meets said product preference data based on said personal data; then (e) generating a consolidated data file for said semi-custom product from said best fit data file and at least one additional data file for the remaining subsections of said product; and (f) additively manufacturing said semi-custom product from said consolidated data file, wherein said step of (c) providing product or product subsection preference data includes weighting (or prioritizing) said distinct product attributes with respect to one another based on preferences of said user, and wherein:

(i) said step of (c) providing product preference data includes bounding the most heavily weighted product or product subsection attribute with a general tolerance range;

(ii) said step (d) includes generating a stringent tolerance within said general tolerance range, and is carried out with said stringent tolerance range less than said general tolerance range; and then (iii) if no best fit data file is identified, repeating step (d) with a relaxed tolerance range greater than said stringent tolerance range but at or within said general tolerance range.

* * * * *